(12) United States Patent
Lee

(10) Patent No.: US 10,907,391 B2
(45) Date of Patent: Feb. 2, 2021

(54) VEHICLE TRUNK OPENING AND CLOSING CONTROL DEVICE

(71) Applicants: HYUNDAI MOTOR COMPANY, Seoul (KR); KIA MOTORS CORPORATION, Seoul (KR)

(72) Inventor: Sang Won Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 259 days.

(21) Appl. No.: 16/202,643

(22) Filed: Nov. 28, 2018

(65) Prior Publication Data

US 2020/0109587 A1 Apr. 9, 2020

(30) Foreign Application Priority Data

Oct. 5, 2018 (KR) .......................... 10-2018-0118951

(51) Int. Cl.
*B62D 25/10* (2006.01)
*E05F 1/12* (2006.01)
*B62D 25/12* (2006.01)

(52) U.S. Cl.
CPC ............ *E05F 1/1238* (2013.01); *B62D 25/12* (2013.01); *E05Y 2900/548* (2013.01)

(58) Field of Classification Search
CPC .. H04M 1/0237; G06F 1/1616; G06F 1/1681; E05Y 2900/548; A47B 21/02; B60R 11/06; B60R 9/06; B60R 9/065; B60J 7/1621; B60P 1/6427
See application file for complete search history.

(56) References Cited

U.S. PATENT DOCUMENTS

| | | | | |
|---|---|---|---|---|
| 2,783,495 A * | 3/1957 | Vigmostad | ............... | E05F 1/123 16/308 |
| 2,916,763 A * | 12/1959 | Wagner | ........................... | 16/308 |
| 3,339,969 A * | 9/1967 | Bridle | .................... | E05F 1/1238 296/76 |
| 4,223,483 A * | 9/1980 | Stafford | .................. | E05D 15/42 49/250 |
| 4,706,334 A * | 11/1987 | Beckwith | .............. | E05F 1/1238 16/255 |
| 4,712,825 A * | 12/1987 | Braga | ..................... | E05D 3/125 180/89.2 |
| 4,776,626 A * | 10/1988 | Seyler | ..................... | E05D 5/062 296/76 |
| 5,050,270 A * | 9/1991 | Burgei | .................. | E05F 1/1207 16/298 |
| 5,235,725 A * | 8/1993 | Rees | ...................... | E05F 1/1207 16/298 |

(Continued)

*Primary Examiner* — Kiran B Patel
(74) *Attorney, Agent, or Firm* — Morgan, Lewis & Bockius LLP

(57) ABSTRACT

A vehicle trunk opening and closing control device includes a bracket secured to an inner panel of a trunk, a hinge arm rotatably hinged at a first side thereof to the bracket and connected at a second side thereof to a trunk lid, a sliding rail disposed adjacent to one side of the hinge arm and coupled to the hinge arm, and a torsion bar, which is fixed in position by being caught in a slot formed in the bracket and is configured to rotate the hinge arm by applying tension to the sliding rail through contact with the sliding rail.

12 Claims, 7 Drawing Sheets

(56) References Cited

U.S. PATENT DOCUMENTS

| | | | | |
|---|---|---|---|---|
| 5,664,289 A * | 9/1997 | Wolda | E05F 1/1238 | 16/298 |
| 5,758,389 A * | 6/1998 | Wolda | E05F 1/1238 | 16/302 |
| 5,873,619 A * | 2/1999 | Lewkoski | E05D 7/0423 | 16/241 |
| 6,070,929 A * | 6/2000 | Barkley | E05F 1/1033 | 16/75 |
| 6,382,704 B1 * | 5/2002 | Nastasoiu | E05D 5/062 | 16/298 |
| 6,419,293 B1 * | 7/2002 | Nicholas | E05F 1/1033 | 296/76 |
| 6,494,280 B1 * | 12/2002 | Friend | E05F 1/1033 | 16/308 |
| 6,568,033 B2 * | 5/2003 | Kim | E05D 5/062 | 16/334 |
| 7,815,241 B2 * | 10/2010 | Renke | E05F 5/06 | 296/146.11 |
| 7,987,554 B2 * | 8/2011 | Hakamata | E05D 11/0054 | 16/250 |
| 8,500,185 B1 * | 8/2013 | Krajenke | E05F 1/1238 | 296/76 |
| 8,607,416 B2 * | 12/2013 | Krajenke | E05F 1/1238 | 16/297 |
| 8,615,847 B2 * | 12/2013 | Krajenke | E05F 1/1284 | 16/306 |
| 8,863,359 B1 * | 10/2014 | Krajenke | E05D 5/062 | 16/289 |
| 2006/0230578 A1 * | 10/2006 | Renke | E05F 1/1276 | 16/289 |
| 2006/0261626 A1 * | 11/2006 | Okada | E05F 15/611 | 296/76 |
| 2008/0018131 A1 * | 1/2008 | Heath | E05F 1/1033 | 296/76 |
| 2008/0150313 A1 * | 6/2008 | Neubrand | B60J 7/205 | 296/76 |
| 2009/0282648 A1 * | 11/2009 | Lee | E05D 5/062 | 16/297 |
| 2010/0107502 A1 * | 5/2010 | Okada | F16D 37/02 | 49/349 |
| 2010/0275518 A1 * | 11/2010 | Nakazato | E05D 5/062 | 49/386 |
| 2011/0162282 A1 * | 7/2011 | Binder | E05F 1/1238 | 49/386 |
| 2012/0204491 A1 * | 8/2012 | Cain | E05F 1/1033 | 49/386 |
| 2013/0020826 A1 * | 1/2013 | Krajenke | E05F 1/1238 | 296/76 |
| 2013/0119698 A1 * | 5/2013 | Patzer | E05D 5/062 | 296/146.12 |
| 2013/0229026 A1 * | 9/2013 | Thorpe | B62D 25/105 | 296/76 |
| 2014/0333087 A1 * | 11/2014 | Krajenke | E05F 5/06 | 296/76 |
| 2015/0084350 A1 * | 3/2015 | Kim | E05B 83/18 | 292/194 |
| 2015/0300069 A1 * | 10/2015 | Sato | E05F 1/1033 | 49/386 |
| 2017/0286591 A1 * | 10/2017 | Kobayashi | G06F 30/23 | |
| 2019/0169905 A1 * | 6/2019 | Hyun | E05F 1/1261 | |

\* cited by examiner

[FIG. 1]
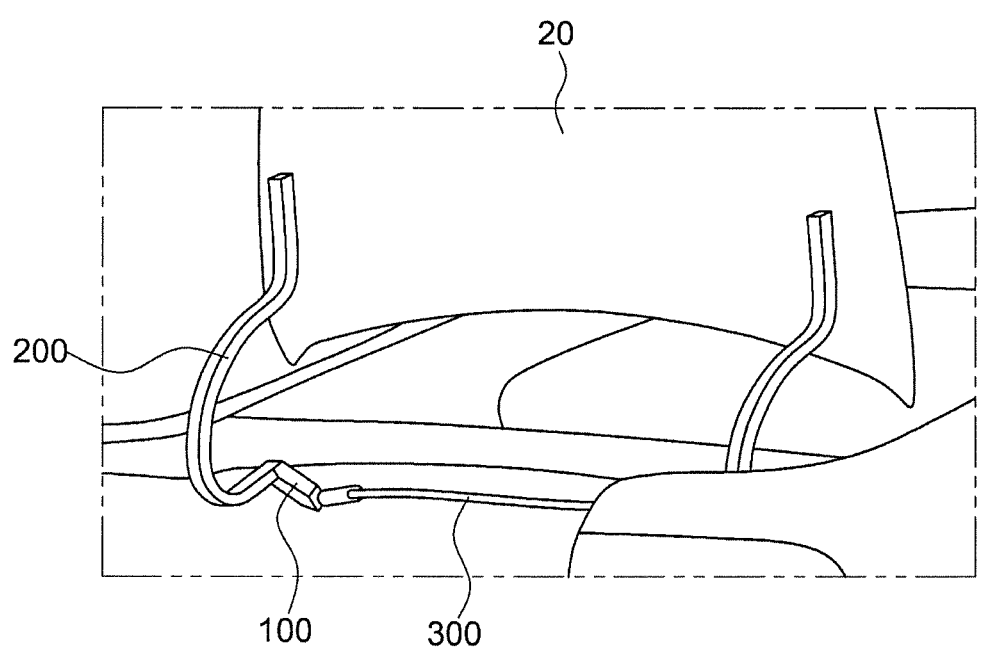

[FIG. 2]
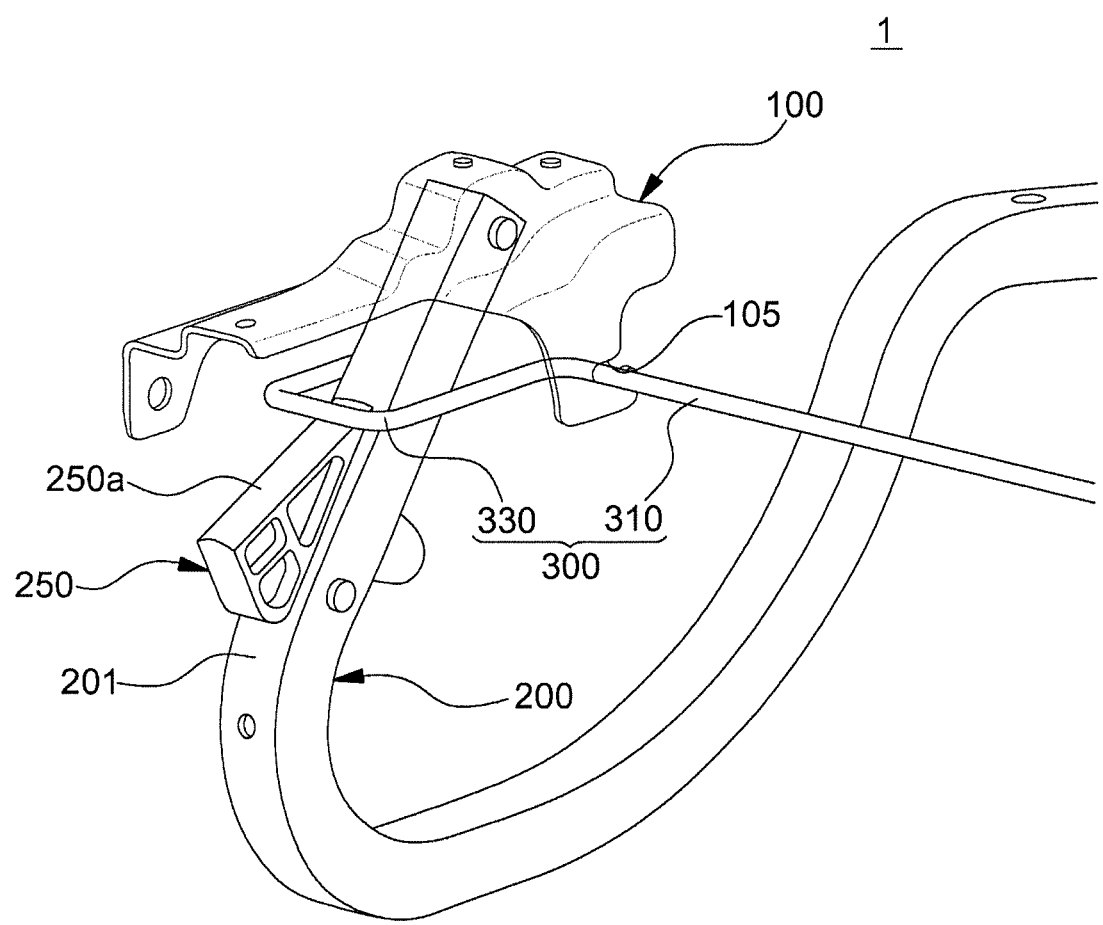

[FIG. 3A]
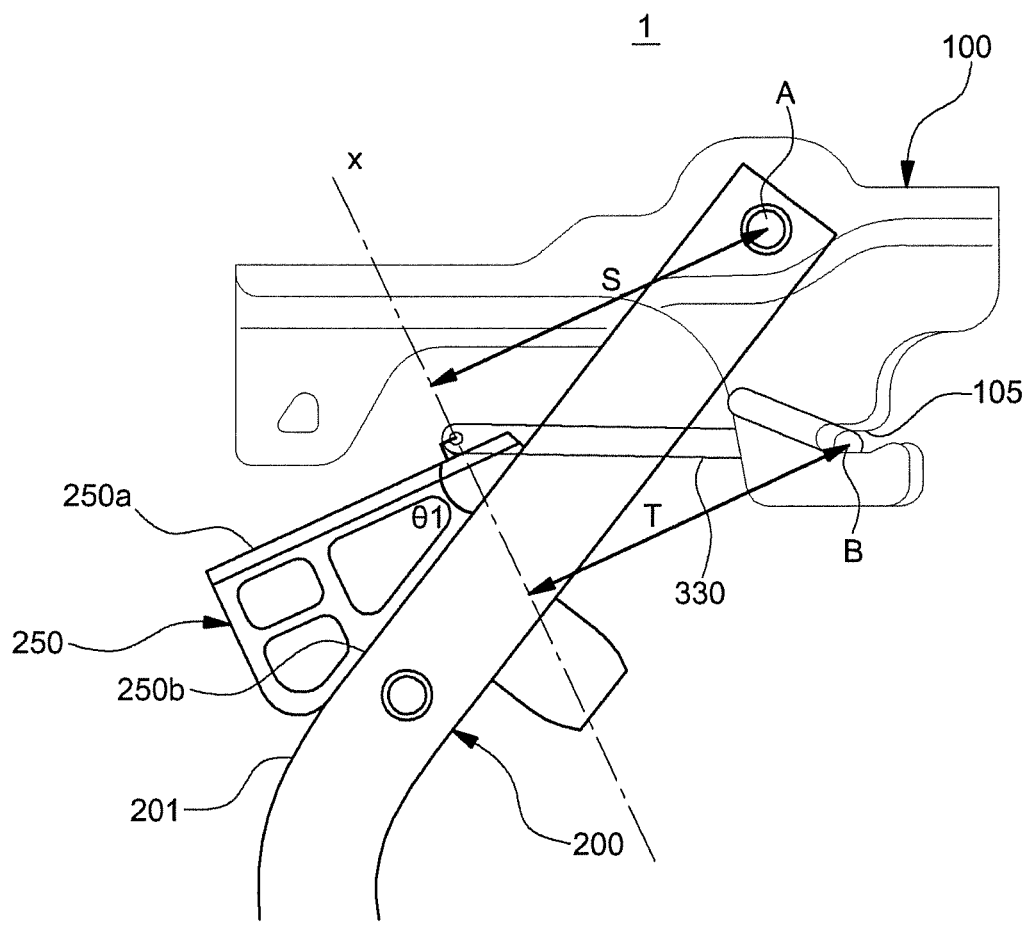

[FIG. 3B]
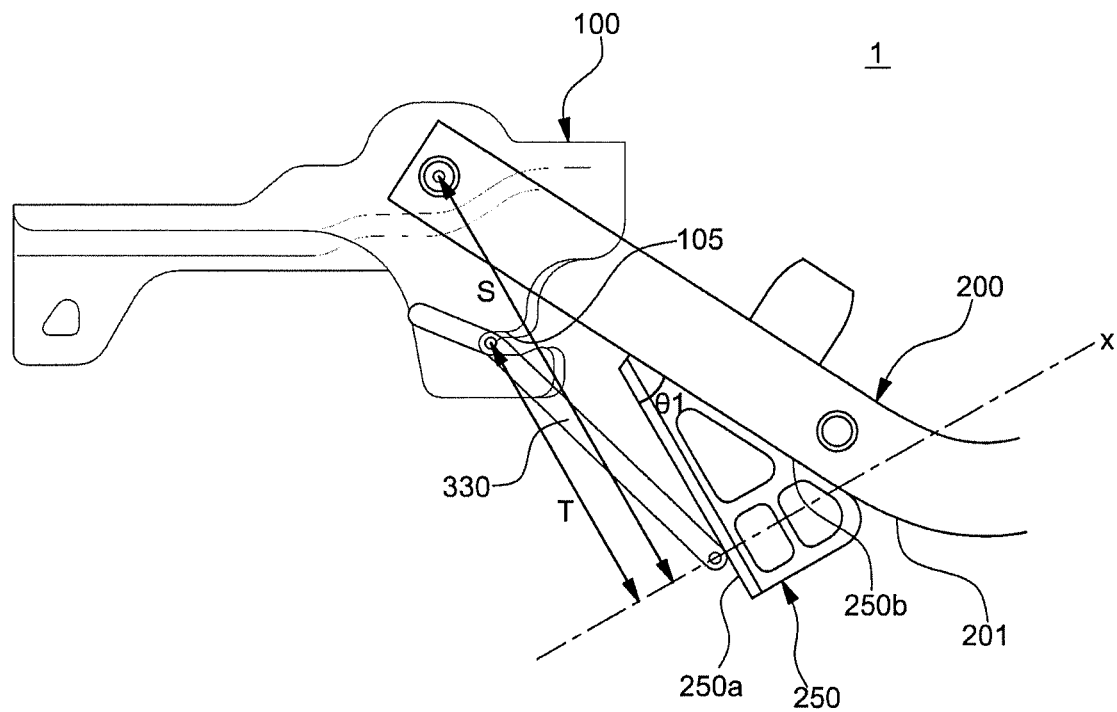

[FIG. 4]
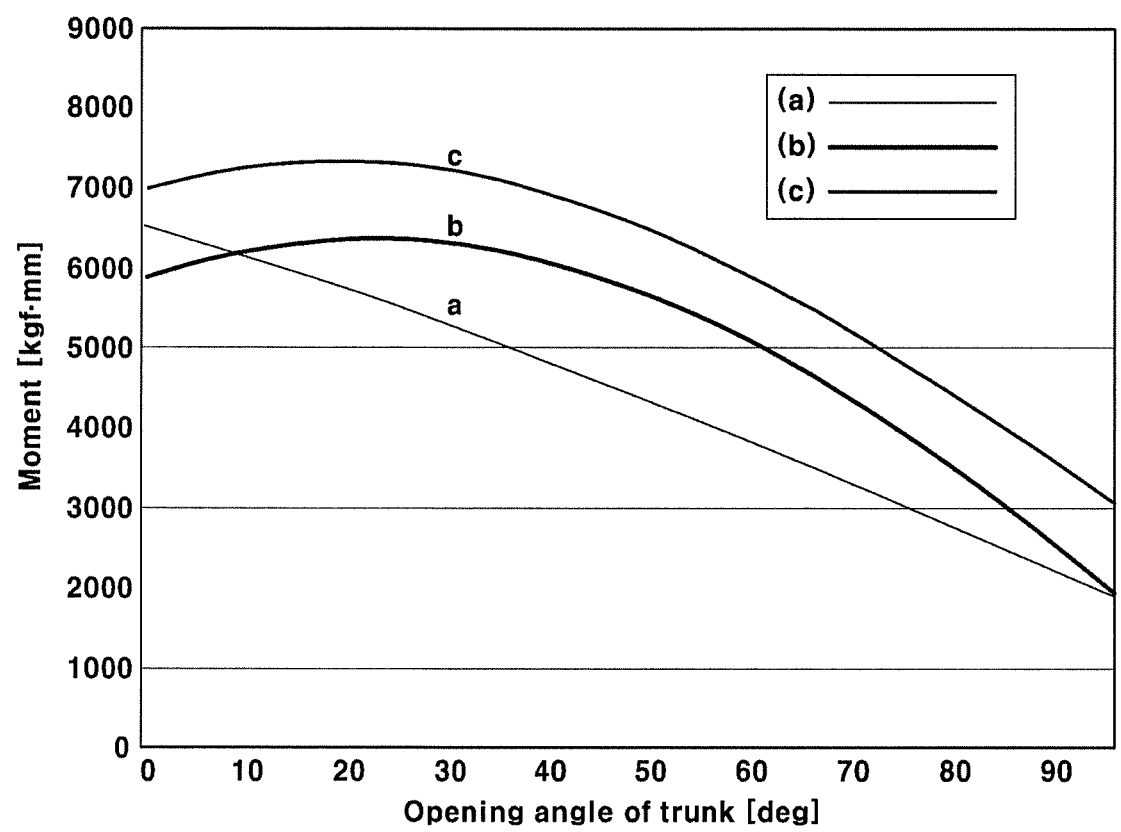

[FIG. 5]
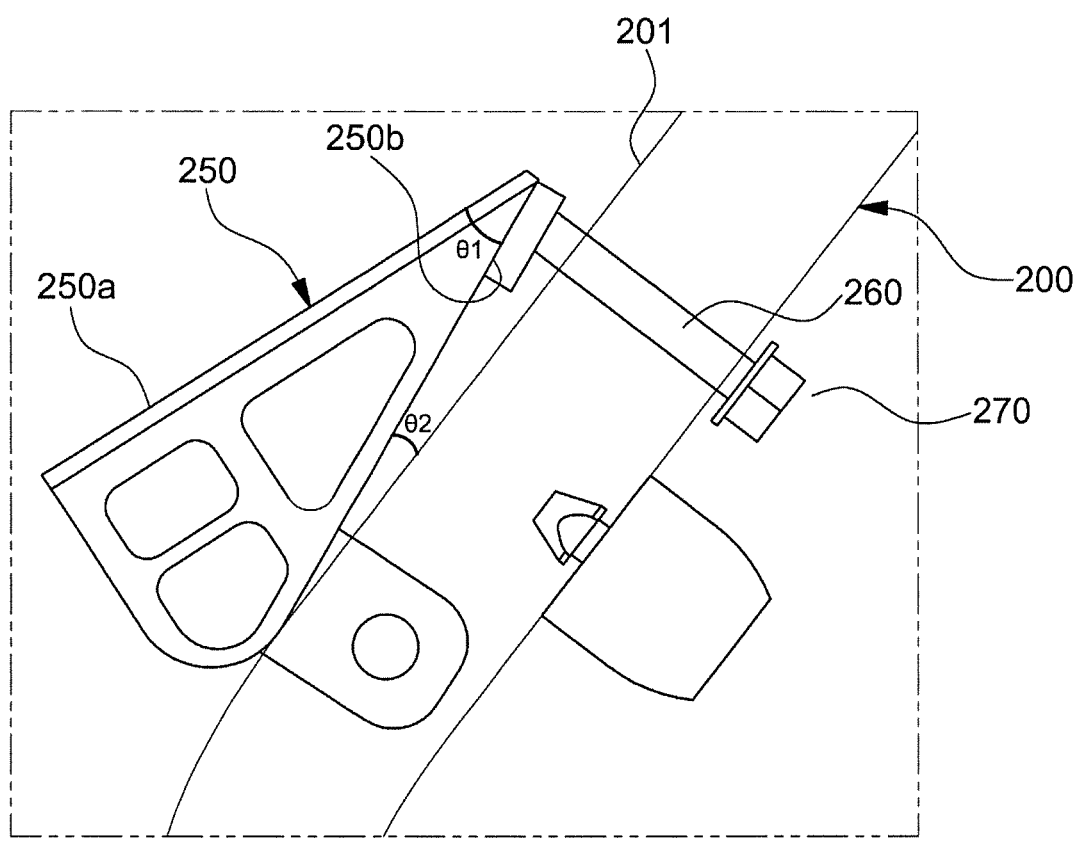

[FIG. 6]
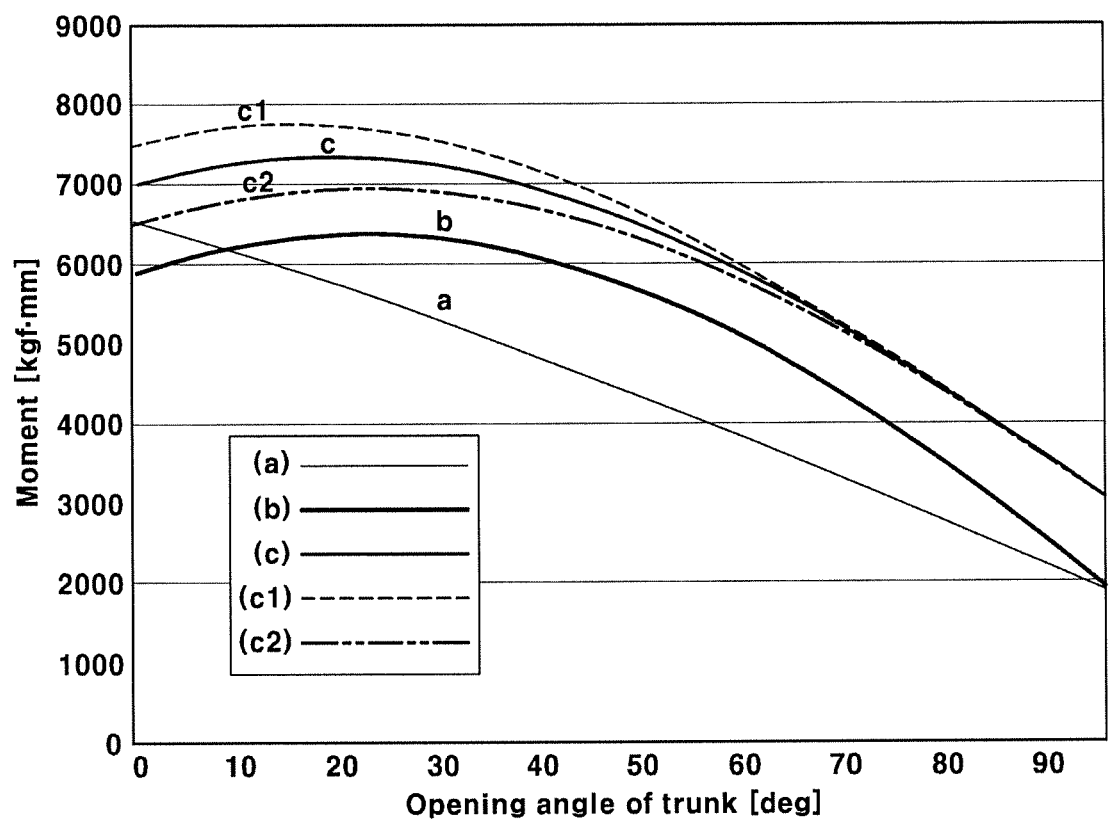

VEHICLE TRUNK OPENING AND CLOSING CONTROL DEVICE

CROSS-REFERENCE TO RELATED APPLICATION

This application is based on and claims the benefit of priority to Korean Patent Application No. 10-2018-0118951 filed on Oct. 5, 2018 with the Korean Intellectual Property Office, the entire contents of which are incorporated herein by reference.

TECHNICAL FIELD

The present disclosure relates to a vehicle trunk opening and closing control device. More particularly, it relates to a vehicle trunk opening and closing control device including a sliding rail for guiding movement of a torsion bar.

BACKGROUND

Generally, vehicles have a trunk provided at the rear side thereof in order to accommodate luggage and a trunk lid rotatably mounted to a vehicle body in order to open and close the trunk. The trunk lid is opened and closed by being rotated about a hinge shaft, and a latch device provided at the trunk lid is locked to and unlocked from a striker provided at the vehicle body.

When the lock is released to open the trunk lid, the trunk lid is opened to a certain height by the elastic force of a torsion bar so that the user may easily open the trunk lid.

Generally, examples of vehicle trunk opening and closing devices include a pop-up-type opening and closing device using a four-bar linkage mechanism and a full-open-type opening and closing device using a coil spring instead of a torsion bar.

However, the conventional full-open-type opening and closing device (including a coil spring and a gas lifter) incurs relatively high costs. In the case of fully opening the trunk lid merely by increasing the force of the torsion bar using the conventional four-bar linkage pop-up-type opening and closing device, the trunk lid is opened excessively rapidly, and is not closed smoothly.

The above information disclosed in this Background section is only for enhancement of understanding of the background of the invention, and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide a vehicle trunk opening and closing control device, which is capable of fully opening a trunk lid with a simple structure using a sliding rail.

It is another object of the present disclosure to provide a vehicle trunk opening and closing control device, which includes a sliding rail that is adjustable in angle so as to fully open a trunk lid.

In one aspect, the present disclosure provides a vehicle trunk opening and closing control device including a bracket secured to an inner panel of a trunk, a hinge arm having a first side rotatably hinged to the bracket and a second side connected to a trunk lid, a sliding rail disposed adjacent to the first side of the hinge arm and coupled to the hinge arm, and a torsion bar fixed in position by being caught in a slot disposed in the bracket, the torsion bar being configured to rotate the hinge arm by applying tension to the sliding rail through contact with the sliding rail.

In a preferred embodiment, the sliding rail and the torsion bar may be maintained in contact with each other while the trunk lid is opened or closed.

In another preferred embodiment, the bracket may be provided in a pair, and the torsion bar may include a first torsion bar extending between the pair of brackets and a second torsion bar connected to the first torsion bar and contacting the sliding rail. The second torsion bar may be bent and extend in a direction perpendicular to the direction in which the first torsion bar extends.

In still another preferred embodiment, when the trunk lid is in a closed state, the hinge arm may be located in a space defined by a bent portion of the second torsion bar.

In yet another preferred embodiment, when the trunk lid is in a closed state, the second torsion bar may be in contact with a first portion of the sliding rail. When the trunk lid is in an opened state, the second torsion bar may be in contact with a second portion of the sliding rail. The first portion of the sliding rail may be disposed at a higher position than the second portion of the sliding rail.

In still yet another preferred embodiment, the second torsion bar may open or close the trunk lid by sliding between the first portion and the second portion of the sliding rail.

In a further preferred embodiment, the sliding rail may include a first surface that is in contact with the torsion bar, and a second surface that is in contact with the one surface of the hinge arm.

In another further preferred embodiment, the first surface of the sliding rail may form a predetermined angle with the second surface of the sliding rail.

In still another further preferred embodiment, the sliding rail may include a connection member for separating the second surface of the sliding rail and the one surface of the hinge arm from each other. An angle formed between the second surface of the sliding rail and the one surface of the hinge arm may be changed by the connection member. The second surface of the sliding rail and the one surface of the hinge arm may face each other.

In still another further preferred embodiment, a first side of the sliding rail may be hinged to the hinge arm, and a second side of the sliding rail may be connected to the connection member. As a portion of the second surface of the sliding rail and the one surface of the hinge arm are separated from each other by the connection member, the angle formed between the second surface of the sliding rail and the one surface of the hinge arm may increase.

In yet another further preferred embodiment, the connection member may include an extending portion, connected to the sliding rail while penetrating the hinge arm, and a bolt disposed opposite to the sliding rail with respect to the hinge arm in order to fix the extending portion.

In still yet another further preferred embodiment, as the angle formed between the second surface of the sliding rail and the one surface of the hinge arm decreases, a difference between a self-weight moment of the trunk lid and an operation moment applied to the sliding rail by the torsion bar may be reduced.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is a view showing a trunk to which a vehicle trunk opening and closing control device according to an embodiment of the present disclosure is applied;

FIG. 2 is a perspective view of the vehicle trunk opening and closing control device according to the embodiment of the present disclosure;

FIG. 3A is a cross-sectional view of the vehicle trunk opening and closing control device according to the embodiment of the present disclosure when the trunk is in the closed state;

FIG. 3B is a cross-sectional view of the vehicle trunk opening and closing control device according to the embodiment of the present disclosure when the trunk is in the opened state;

FIG. 4 is a graph showing the relationship between the operation moment of the vehicle trunk opening and closing control device according to the embodiment of the present disclosure and the self-weight moment of a trunk lid;

FIG. 5 is a cross-sectional view of a sliding rail according to the embodiment of the present disclosure; and FIG. 6 is a graph showing the relationship between the operation moment of the vehicle trunk opening and closing control device according to the embodiment of the present disclosure and the self-weight moment of the trunk lid depending on the change in position of the sliding rail.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Advantages and features of the present disclosure and methods for achieving them will be made clear from embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the disclosure to those skilled in the art. The present disclosure is defined only by the scope of the claims. The same reference numerals used throughout the specification refer to the same constituent elements.

Exemplary embodiments in the specification will be described with reference to cross-sectional views and/or plan views, which are ideal exemplary views of the present disclosure. Thus, the shapes shown in the drawings may be changed by manufacturing technology and/or allowable errors. Therefore, the exemplary embodiments of the present disclosure are not limited to the specific shapes shown in the drawings, but include variations in shape depending on a manufacturing process. For example, an etching area illustrated as having a right angle may be rounded, or may have a predetermined curvature. Thus, the areas exemplarily illustrated in the drawings have schematic properties, and the shapes of the areas shown in the drawings are merely to illustrate specific shapes of elements but not to limit the scope of the present disclosure.

FIG. 1 is a view showing a trunk to which a vehicle trunk opening and closing control device according to an embodiment of the present disclosure is applied.

Referring to FIG. 1, the vehicle trunk opening and closing control device may include a bracket 100 secured to an inner panel of a trunk 10, a hinge arm 200 rotatably hinged at one side thereof to the bracket 100 and connected at the opposite side thereof to the bottom surface of a trunk lid 20, and a torsion bar 300 configured to apply elastic force in the direction in which the trunk lid 20 is opened.

The torsion bar 300 may be connected at one end thereof to the bracket 100, and may open the trunk lid 20 by applying tension to a sliding rail (not illustrated) coupled to the hinge arm 200. When the trunk lid 20 is in the closed state, the torsion bar 300 may be twisted, and may provide tension in the direction in which the trunk lid 20 is opened. When the trunk lid 20 is in the opened state, the opened state of the trunk lid 20 may be maintained by the tension applied to the sliding rail (not illustrated) by the torsion bar 300.

FIG. 2 is a perspective view of the vehicle trunk opening and closing control device according to the embodiment of the present disclosure.

Referring to FIGS. 1 and 2, the vehicle trunk opening and closing control device 1 may include a bracket 100, a hinge arm 200, a sliding rail 250, and a torsion bar 300.

The bracket 100 may be provided in a pair, and the pair of brackets 100 may be mounted to the inner panel of the trunk 10. The bracket 100 may have therein a slot 105 into which the torsion bar 300 is inserted.

The hinge arm 200 may be hinged to the bracket 100 so as to be rotatable. The hinge arm 200 may connect the bracket 100 to the trunk lid 20. The hinge arm 200 may be provided in a number corresponding to the number of brackets 100. That is, the hinge arm 200 may be provided in a pair. The hinge arm 200 may have a curved shape. The trunk lid 20 may move according to the hinge movement of the hinge arm 200.

The sliding rail 250 may be disposed on a surface 201 of the hinge arm 200. The sliding rail 250 may guide the movement and rotation of the torsion bar 300. The sliding rail 250 may have a first surface 250a (e.g., a top surface) in contact with the torsion bar 300 and a second surface 250b (e.g., a bottom surface) in contact with the surface 201 of the hinge arm 200. The first surface 250a and the second surface of the sliding rail 250 may form a predetermined angle therebetween, and the first surface 250a of the sliding rail 250 and the surface 201 of the hinge arm 200 may form a predetermined angle therebetween. The angle formed between the first surface 250a and the second surface of the sliding rail 250 may be the same as the angle formed between the first surface 250a of the sliding rail 250 and the surface 201 of the hinge arm 200. The sliding rail 250 may be formed in the shape of a pentahedron. However, the shape of the sliding rail 250 is not limited to a particular shape. The sliding rail 250 may be formed in the shape of a polyhedron in which the portion thereof contacting the torsion bar 300 is flat.

The torsion bar 300 may include a first torsion bar 310 extending between the pair of brackets 100 and a second torsion bar 330 connected to the first torsion bar 310 and contacting the sliding rail 250. The first torsion bar 310 may extend straight between the pair of brackets 100, and the second torsion bar 330 may be bent and extend in a direction different from the direction in which the first torsion bar 310 extends. For example, the second torsion bar 330 may extend in a direction perpendicular to the direction in which the first torsion bar 310 extends, and may have a U-shape. A portion of the second torsion bar 330 may be in contact with the first surface 250a of the sliding rail 250. When the trunk lid 20 is opened or closed, the second torsion bar 330 may be maintained in contact with the first surface 250a of the sliding rail 250. As the second torsion bar 330 applies tension to the sliding rail 250, the trunk lid 20 may be opened.

The vehicle trunk opening and closing control device 1 according to the embodiment of the present disclosure is capable of controlling the degree to which the trunk lid 20 is opened while being implemented with fewer parts than the conventional device using a four-bar linkage mechanism or a coil spring. Therefore, the manufacturing costs of the vehicle trunk opening and closing control device 1 may be reduced.

FIG. 3A is a cross-sectional view of the vehicle trunk opening and closing control device according to the embodiment of the present disclosure when the trunk 10 is in the closed state, and FIG. 3B is a cross-sectional view of the vehicle trunk opening and closing control device according to the embodiment of the present disclosure when the trunk 10 is in the opened state.

Referring to FIGS. 1 and 3A, when the trunk lid 20 is in the closed state, the second torsion bar 330 may be located so as to surround the hinge arm 200. That is, the hinge arm 200 may be located in the space defined by the bent portion of the second torsion bar 330. The second torsion bar 330 may be in contact with the upper portion of the sliding rail 250.

The sliding rail 250 may have a first surface 250a (e.g., a top surface) and a second surface 250b (e.g., a bottom surface). The second surface 250b of the sliding rail 250 may be disposed so as to contact or face one surface 201 of the hinge arm 200. The point at which the hinge arm 200 is hinged to the bracket 100 will be referred to as a first point A, and the point at which the torsion bar 300 is caught in the slot 105 in the bracket 100 will be referred to as a second point B. A straight line, which is perpendicular to the first surface 250a of the sliding rail 250 at the point at which the sliding rail 250 and the torsion bar 300 contact each other, will be referred to as a reference line x. The minimum distance between the reference line x and the first point A will be referred to as a first distance S, and the minimum distance between the reference line x and the second point B will be referred to as a second distance T. Here, the operation moment of the vehicle trunk opening and closing control device 1 may be a value obtained by multiplying the torque of the torsion bar 300 by the link ratio (S/T).

Operation moment=Torque of Torsion Bar×$S/T$

The operation moment may mean the torque value at which the opening and closing control device 1 opens the trunk lid 20. That is, the torque value applied to the sliding rail 250 by the torsion bar 300 may be the operation moment.

Referring to FIGS. 1 and 3B, when the trunk lid 20 is in the fully opened state, the second torsion bar 330 may be in contact with the lower portion of the sliding rail 250. The upper portion of the sliding rail 250 may be a portion that is formed at a higher position than the lower portion of the sliding rail 250. The second torsion bar 330 may apply tension to the sliding rail 250. In addition, the second torsion bar 330 may slide from the upper portion of the sliding rail 250 to the lower portion of the sliding rail 250 due to a first angle θ1 formed between the first surface 250a of the sliding rail 250 and the surface 201 of the hinge arm 200. The trunk lid 20 may be moved from the closed state to the opened state by the sliding of the second torsion bar 330.

FIG. 4 is a graph showing the relationship between the operation moment of the vehicle trunk opening and closing control device according to the embodiment of the present disclosure and the self-weight moment of the trunk lid 20. The x-axis in the graph represents the opening angle of the trunk lid 20, and the y-axis in the graph represents the moment value. The unit of the moment value is kgf·mm. The line (a) represents the torque value of the torsion bar, the line (b) represents the self-weight moment of the trunk lid 20, and the line (c) represents the operation moment of the opening and closing control device 1.

The relationship among the torque of the torsion bar 300, the self-weight moment of the trunk lid 20 and the operation moment of the opening and closing control device 1 may be known from FIGS. 1, 3A, 3B and 4. The self-weight moment of the trunk lid 20 is the moment applied toward the ground due to the weight of the trunk lid 20. The torque of the torsion bar 300 is a torque value applied by the torsion bar 300 to open the trunk lid 20. The operation moment of the vehicle trunk opening and closing control device 1 is a value obtained by multiplying the torque of the torsion bar 300 by the link ratio (S/T).

A pop-up operation may occur at a point where the self-weight moment and the operation moment are equal to each other. The pop-up operation is a phenomenon in which the trunk lid 20 is not fully opened but is maintained partially open. The vehicle trunk opening and closing control device 1 according to the embodiment of the present disclosure may adjust the link ratio (STT) using the sliding rail 250. The operation moment may be adjusted by the first angle θ1 formed between the first surface 250a of the sliding rail 250 and the surface 201 of the hinge arm 200. According to the embodiment of the present disclosure, it is possible to provide the sliding rail 250 such that the line representing the operation moment and the line representing the self-weight moment do not overlap each other so as to prevent the pop-up operation. That is, the line (b) and the line (c) in the graph in FIG. 4 do not overlap each other. Therefore, the vehicle trunk opening and closing control device 1 may realize the full opening of the trunk 10.

FIG. 5 is a cross-sectional view of the sliding rail according to the embodiment of the present disclosure.

Referring to FIGS. 1, 2 and 5, the first surface 250a and the second surface 250b of the sliding rail 250 may form a first angle θ1 therebetween, and the second surface 250b of the sliding rail 250 and the surface 201 of the hinge arm 200 may form a second angle θ2 therebetween. One side of the sliding rail 250 may be hinged to the hinge arm 200, and the opposite side of the sliding rail 250 may be coupled to connection members 260 and 270. The one side of the sliding rail 250 may refer to a lower portion of the sliding rail 250 in the state in which the sliding rail 250 is coupled to the hinge arm 200. The opposite side of the sliding rail 250 may refer to an upper portion of the sliding rail 250 in the state in which the sliding rail 250 is coupled to the hinge arm 200. The second surface 250b of the sliding rail 250 and the surface 201 of the hinge arm 200 may be spaced apart from each other by the connection members 260 and 270. Since the one side of the sliding rail 250 is hinged to the hinge arm 200, the second angle θ2 may be increased as the second surface 250b of the sliding rail 250 and the surface 201 of the hinge arm 200 are separated from each other by the connection members 260 and 270. The connection members 260 and 270 may include an extending portion 260, which is connected to the sliding rail 250 while penetrating the hinge arm 200, and a bolt 270, which is disposed opposite the sliding rail 250 with respect to the hinge arm 200 in order to fix the extending portion 260.

According to the embodiment of the present disclosure, the connection members 260 and 270 may change the second angle θ2 formed between the second surface 250b of the sliding rail 250 and the surface 201 of the hinge arm 200. As the second angle θ2 is changed, the tension applied to the sliding rail 250 by the torsion bar 300 may be changed. Therefore, the operation moment of the vehicle trunk opening and closing control device 1 may be adjusted by the connection members 260 and 270, whereby the trunk 10 may be fully opened.

FIG. 6 is a graph showing the relationship between the operation moment of the vehicle trunk opening and closing control device 1 according to the embodiment of the present disclosure and the self-weight moment of the trunk lid 20 depending on the change in position of the sliding rail. The x-axis in the graph represents the opening angle of the trunk lid 20, and the y-axis in the graph represents the moment value. The unit of the moment value is kgf·mm. The line (a) represents the torque value of the torsion bar, the line (b) represents the self-weight moment of the trunk lid 20, and the line (c) represents the operation moment of the vehicle trunk opening and closing control device 1. The line (c1) represents the operation moment when the second angle θ2 is increased, and the line (c2) represents the operation moment when the second angle θ2 is decreased.

Referring to FIGS. 1, 2, 5 and 6, the operation moment may be adjusted by changing the second angle θ2 formed between the second surface 250b of the sliding rail 250 and the surface 201 of the hinge arm 200. The line (c) represents the operation moment of the opening and closing control device 1 when the angle formed between the second surface 250b of the sliding rail 250 and the surface 201 of the hinge arm 200 is the second angle θ2. When the second angle θ2 is increased, the link ratio (S/T) at a time point at which the trunk lid 20 is opened is increased, and the operation moment is thus increased. That is, the link ratio (S/T) may be adjusted by adjusting the sliding rail 250. With the increase in the link ratio (S/T), the speed at which the trunk lid 20 is opened may be adjusted, and the trunk lid 20 may be fully opened.

When the second angle θ2 is decreased, the link ratio (S/T) at the time point at which the trunk lid 20 is opened is decreased, and the operation moment is thus decreased. That is, the link ratio (S/T) may be adjusted by adjusting the sliding rail 250. With the decrease in the link ratio (S/T), the speed at which the trunk lid 20 is opened may be adjusted. Therefore, the vehicle trunk opening and closing control device 1 including the sliding rail 250 may prevent the trunk lid 20 from being opened rapidly.

The vehicle trunk opening and closing control device 1 according to the embodiment of the present disclosure may adjust the link ratio (S/T) using the sliding rail 250. The operation moment may be adjusted by changing the second angle θ2 formed between the second surface 250b of the sliding rail 250 and the surface 201 of the hinge arm 200. The speed at which the trunk lid 20 is opened may be adjusted by adjusting the second angle θ2, and the trunk lid 20 may be fully opened. The smaller the second angle θ2 formed between the second surface 250b of the sliding rail 250 and the surface 201 of the hinge arm 200, the smaller the difference between the self-weight moment of the trunk lid 20 and the operation moment applied to the sliding rail 250 by the torsion bar 300. That is, the speed at which the trunk lid 20 is opened and the degree to which the trunk lid 20 is opened may be adjusted by adjusting the second angle θ2. In FIG. 6, the lines (c), (c1) and (c2) do not overlap the line (b). This means that, even when the operation moment is changed by the adjustment of the second angle θ2, the pop-up phenomenon in which the trunk lid 20 is not fully opened does not occur.

As is apparent from the above description, the present disclosure provides a vehicle trunk opening and closing control device, which may be implemented with fewer parts than the conventional device using a linkage mechanism or a coil spring. Therefore, the manufacturing costs of the vehicle trunk opening and closing control device may be reduced.

In addition, a link ratio may be adjusted by adjusting an angle formed between a bottom surface of a sliding rail and one surface of a hinge arm. Accordingly, the speed at which a trunk lid is opened may be adjusted, and the trunk lid may be fully opened.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A vehicle trunk opening and closing control device comprising:
   a bracket secured to an inner panel of a trunk;
   a hinge arm having a first side rotatably hinged to the bracket and a second side connected to a trunk lid;
   a sliding rail disposed adjacent to the first side of the hinge arm and coupled to the hinge arm; and
   a torsion bar fixed in position by being caught in a slot disposed in the bracket, the torsion bar being configured to rotate the hinge arm by applying tension to the sliding rail through contact with the sliding rail.

2. The vehicle trunk opening and closing control device of claim 1, wherein the sliding rail and the torsion bar are maintained in contact with each other while the trunk lid is opened or closed.

3. The vehicle trunk opening and closing control device of claim 1, wherein the bracket is provided in a pair,
   wherein the torsion bar comprises:
   a first torsion bar extending between the pair of brackets; and
   a second torsion bar connected to the first torsion bar and contacting the sliding rail, and
   wherein the second torsion bar is bent and extends in a direction perpendicular to a direction in which the first torsion bar extends.

4. The vehicle trunk opening and closing control device of claim 3, wherein, when the trunk lid is in a closed state, the hinge arm is located in a space defined by a bent portion of the second torsion bar.

5. The vehicle trunk opening and closing control device of claim 3, wherein, when the trunk lid is in a closed state, the second torsion bar is in contact with a first portion of the sliding rail,
   wherein, when the trunk lid is in an opened state, the second torsion bar is in contact with a second portion of the sliding rail, and
   wherein the first portion of the sliding rail is disposed at a higher position than the second portion of the sliding rail.

6. The vehicle trunk opening and closing control device of claim 5, wherein the second torsion bar opens or closes the trunk lid by sliding between the first portion and the second portion of the sliding rail.

7. The vehicle trunk opening and closing control device of claim 1, wherein the sliding rail comprises a first surface that is in contact with the torsion bar, and a second surface that is in contact with the one surface of the hinge arm.

8. The vehicle trunk opening and closing control device of claim 7, wherein the first surface of the sliding rail forms a predetermined angle with the second surface of the sliding rail.

9. The vehicle trunk opening and closing control device of claim 7, wherein the sliding rail comprises a connection member for separating the second surface of the sliding rail and the one surface of the hinge arm from each other,
   wherein an angle formed between the second surface of the sliding rail and the one surface of the hinge arm is changed by the connection member, and
   wherein the second surface of the sliding rail and the one surface of the hinge arm face each other.

10. The vehicle trunk opening and closing control device of claim 9, wherein a first side of the sliding rail is hinged to the hinge arm, and a second side of the sliding rail is connected to the connection member, and
    wherein, as a portion of the second surface of the sliding rail and the one surface of the hinge arm are separated from each other by the connection member, the angle formed between the second surface of the sliding rail and the one surface of the hinge arm increases.

11. The vehicle trunk opening and closing control device of claim 9, wherein the connection member comprises an extending portion, connected to the sliding rail while penetrating the hinge arm, and a bolt disposed opposite to the sliding rail with respect to the hinge arm in order to fix the extending portion.

12. The vehicle trunk opening and closing control device of claim 9, wherein, as the angle formed between the second surface of the sliding rail and the one surface of the hinge arm decreases, a difference between a self-weight moment of the trunk lid and an operation moment applied to the sliding rail by the torsion bar is reduced.

* * * * *